US007742964B2

(12) United States Patent
Al-Saleh (10) Patent No.: US 7,742,964 B2
(45) Date of Patent: Jun. 22, 2010

(54) METHODS AND SYSTEMS FOR ISSUING A CONVERTIBLE FINANCIAL INSTRUMENT

(75) Inventor: Mustafa E. Al-Saleh, Kaifan - Block Area 5, St 55 - House 12, Kuwait (KW)

(73) Assignee: Mustafa E. Al-Saleh (KW)

( * ) Notice: Subject to any disclaimer, the term of this patent is extended or adjusted under 35 U.S.C. 154(b) by 538 days.

(21) Appl. No.: 11/271,301

(22) Filed: Nov. 10, 2005

(65) Prior Publication Data
US 2007/0106579 A1    May 10, 2007

(51) Int. Cl.
*G06Q 40/00*    (2006.01)
(52) U.S. Cl. ............................. 705/36 R; 705/37; 705/35
(58) Field of Classification Search ................... 705/35, 705/36 R, 37, 40, 39, 14, 36 T, 4, 38
See application file for complete search history.

(56) References Cited

U.S. PATENT DOCUMENTS

| | | | |
|---|---|---|---|
| 2003/0130941 A1 | 7/2003 | Birle, Jr. et al. | |
| 2003/0135446 A1 | 7/2003 | Birle, Jr. et al. | |
| 2003/0233324 A1* | 12/2003 | Hammour et al. | 705/40 |
| 2004/0098327 A1 | 5/2004 | Seaman | |
| 2005/0080706 A1 | 4/2005 | Birle et al. | |
| 2005/0160025 A1 | 7/2005 | Birle et al. | |
| 2006/0136313 A1* | 6/2006 | Driver et al. | 705/35 |
| 2006/0190373 A1* | 8/2006 | Perg et al. | 705/35 |
| 2006/0208061 A1* | 9/2006 | Carragher | 705/39 |
| 2007/0038551 A1* | 2/2007 | Shah | 705/37 |

OTHER PUBLICATIONS www.wikipedia.com "Islamic Banking".*

Muhamoud Amin El-Gamal "Overview of Islamic Finanace" Occasional Paper No. 4, Department of Treasury, Aug. 2006.*
Anonymous "Kuwait Firm to Sell First Convertible Islamic Bond Total Securitization" Sep. 9, 2005, Total Securitization.*
Anonymous "Islamic Blending Progect Finance" Sep. 2005, Euromoney Institutional Investor Plc.*
Azmi, "Islamic Bond, Structure and Namagement" Apr. 2005, Business Recorder.*
Muhamoud Amin El-Gamal "Overview of Islamic Finance" Occasional Paper No. 4, Department of Treasury, Aug. 2006.*
Parker, Unique Islamic Treasury Bond (Sukook) Launched, IslamBank. Community, Wednesday, Oct. 23, Topic History of IslamBanking.

(Continued)

*Primary Examiner*—Kelly Campen
(74) *Attorney, Agent, or Firm*—Armstrong Teasdale LLP (57) ABSTRACT

A convertible financial instrument for raising capital by an issuing business in compliance with Sharia principles includes a sukuk portion and a conversion portion. The sukuk portion represents a non equity ownership interest in the business. The sukuk portion includes a coupon return paid from at least one of profits and capital gains of the business. The sukuk portion is redeemable at a maturity date at a face value of the sukuk portion. The conversion portion is exercisable upon reaching a conversion date. The conversion portion is exercisable to convert the sukuk portion based on a predetermined formula into a converted financial instrument representing an equity ownership interest in the business. The predetermined formula does not include a conventional premium formula that is based on a time value of money and an interest rate since such a conventional premium formula does not comply with Sharia principles.

25 Claims, 4 Drawing Sheets

OTHER PUBLICATIONS

Synthetic Debt in Islamic Banking and Finance?, Electrum Partners L.L.C., 2003.

Haider, Islamic Banks May Launch New Instruments to Raise Capital, DailyTimes, Feb. 7, 2004, p. 5.

* cited by examiner

METHODS AND SYSTEMS FOR ISSUING A CONVERTIBLE FINANCIAL INSTRUMENT

BACKGROUND OF THE INVENTION

This invention relates generally to a method and system for issuing a convertible financial instrument and, more particularly, to a method and system for issuing a convertible financial instrument in compliance with Sharia principles.

Within the United States, and throughout the world, the financial industry is a very complex and diverse industry. Businesses are oftentimes required to borrow money or other capital from the financial industry for a wide range of expenses. For example, a business may need to borrow money to expand its operations. However, in at least some cases, when a business is required to borrow a significant amount of money (e.g., hundreds of millions of dollars), the business may not be able to locate a single bank or lending institution willing to lend the full amount to the business. In such cases, the business may be required to issue bonds, other debt instruments and/or equity instruments in a public market to raise the capital needed. In these types of financial offerings, instead of a single bank lending a significant amount of money to the business, hundreds of people lend a smaller amount of capital to the issuer of the bond or, in case of an equity instrument, shares of stock until the issuer gets their desired amount of capital. These bonds are know as debt instruments. These shares of stock are known as equity instruments.

A purchaser of a bond, however, does not loan their money to the bond issuing business for free. The business must typically pay the purchaser a premium or "coupon" at a pre-determined interest rate in exchange for using the purchaser's money. These interest payments are usually made every six months until maturity of the bond. There are some exceptions to this such as zero coupon bonds which instead give the purchaser a large lump-sum payment once the bond has reached maturity.

A purchaser of a share of stock owns an equity interest in the business. In other words, a shareholder has an ownership interest in the business and has an interest in any surplus of the business after payment of debt.

Because the financial industry is such a complex and diverse industry that practices throughout the world, the financial industry must also be sensitive to a variety of religious and cultural laws. For example, Islamic finance is finance in accordance with Sharia principles. Sharia is a law system inspired by Islam and followed by Muslims throughout the world. One of the essential beliefs of Islamic finance is the prohibition of payment or receipt of interest, or "riba". Under Sharia principles, lending and/or dealing in money in the same way as one would trade commodities is prohibited. Returns on loaned money must be based on actual profits generated and not on pre-determined interest rates. A financial institution that lends money must take part in the risk to make a legitimate gain in accordance with Sharia law.

Accordingly, businesses interested in raising capital in the Muslim world and financial institutions interested in servicing such businesses must be able to offer financial instruments including debt-related instruments that comply with Sharia law. However, a typical debt-related instrument (e.g., a bond) does not comply with Sharia law because these types of debt-related instruments include a return paid by the business to the investor wherein the return is based on interest payments and not based on profits generated by the business. Therefore, at least in the Muslim world, financial institutions must be able to offer financial instruments that include a return paid by the business to the investor wherein the return is based on actual profits generated and not on pre-determined interest rates.

BRIEF SUMMARY OF THE INVENTION

In one aspect, a convertible financial instrument for raising capital by an issuing business in compliance with Sharia principles is provided. The financial instrument includes a sukuk portion representing a non-equity ownership interest in the business, and a conversion portion exercisable upon reaching a conversion date. The sukuk portion includes a coupon return paid from at least one of profits and capital gains of the business. The sukuk portion is redeemable at a maturity date at a face value of the sukuk portion. The conversion portion is exercisable to convert the sukuk portion based on a predetermined formula into a converted financial instrument representing an equity ownership interest in the business.

In another aspect, a method for providing a convertible financial instrument for raising capital by an issuing business in compliance with Sharia principles is provided. The method includes issuing a sukuk having a conversion feature and a coupon return, and exercising the conversion feature upon reaching a conversion date. The sukuk represents a non-equity ownership interest in the business. The coupon return is paid from at least one of profits and capital gains of the business. The sukuk is redeemable at a maturity date at a face value of the sukuk. The conversion feature is exercisable for converting the sukuk based on a predetermined formula into a converted financial instrument representing an equity ownership interest in the business.

In another aspect, a network-based system for issuing a convertible financial instrument to a customer for raising capital for an issuing business in compliance with Sharia principles is provided. The system includes a database for storing data relating to the business and relating to the convertible financial instrument including rights and obligations associated with the financial instrument, a client system that includes a browser, and a server system coupled to the database and the client system. The server system is configured to display information stored in the database on the client system including financial instrument data and business data, receive an acknowledgment from the client system that the customer has reviewed the displayed information, issue to the customer the convertible financial instrument including a sukuk having a conversion feature and a coupon return, and prompt the customer to exercise the conversion feature after reaching a conversion date. The sukuk represents a non-equity ownership interest in the business. The coupon return is paid from at least one of profits and capital gains of the business. The sukuk is redeemable at a maturity date at a face value of the sukuk. The conversion feature is exercisable to convert the sukuk based on a predetermined formula into a converted financial instrument representing an equity ownership interest in the business.

DETAILED DESCRIPTION OF THE INVENTION

The present invention relates to a method and system for providing a convertible financial instrument in compliance with Sharia principles. In the example embodiment, the convertible financial instrument described herein includes a sukuk portion and a conversion portion. The sukuk portion represents a non-equity ownership interest in the business. The sukuk portion may also represent a beneficial ownership interest in an underlying asset of the business. The sukuk portion includes a coupon return that is paid from rent or lease payments, and/or profits or capital gains of the business. The sukuk portion is redeemable at a maturity date at a face value of the sukuk. The sukuk holders do not receive any payments qualifying as interest payments for investing in the sukuk. The conversion portion of the sukuk is exercisable upon reaching a conversion date. The conversion portion gives the sukuk holder the right to convert the sukuk portion into a converted financial instrument which represents an equity ownership interest in the business (e.g., stock). In other words, the conversion portion of the sukuk enables a sukuk holder to convert a non-equity ownership interest in the business into an equity ownership interest in the business upon reaching a conversion date. The conversion is based on a predetermined formula.

Exemplary processes for issuing such a convertible financial instrument are also described herein. The systems and processes described herein include issuing a sukuk having a conversion feature and a coupon return, and exercising the conversion feature upon reaching a conversion date. The sukuk includes a non-equity ownership interest in an asset or business issuing the sukuk. The sukuk portion may also include a beneficial ownership interest in an underlying asset of the business. The coupon return is paid from rent or lease payments, and/or profits or capital gains of the business. The conversion feature is exercisable by the sukuk holder and enables the sukuk holder to convert the held sukuk into an equity-based financial instrument. The equity-based financial instrument includes, in one embodiment, at least one of common stock, preferred stock or any other financial instrument that represents an equity ownership interest in an asset or business.

The exemplary systems described herein include a network-based system for issuing the convertible financial instrument described above. A technical effect of the systems and processes described herein include issuing the convertible financial instrument to an investor for raising capital for an issuing business. The financial instrument issued complies with Sharia principles. An exemplary system includes a database for storing data relating to the business and relating to the convertible financial instrument including rights and obligations associated with the offering of the financial instrument. The system also includes a client system. The client system is typically used by the investor during the process of issuing the financial instrument. The client system can be used by the business to provide information to the investor prior to and after issuance of the financial instrument. The system also includes a server system coupled to the database and the client system.

In the example embodiment, the server system is configured to display information stored in the database on the client system including financial instrument data and business data, and receive an acknowledgment from the client system that the investor has reviewed the displayed information. The server is further configured to issue to the investor the convertible financial instrument which includes a sukuk having a conversion feature and a coupon return. The sukuk represents a non-equity ownership interest in the business as described above. Additionally, the server system is configured to prompt the customer using the client system to exercise the conversion feature of the sukuk after reaching a conversion date. The conversion feature is exercisable by the sukuk holder and enables the sukuk holder to convert the sukuk into an equity-based financial instrument.

As stated above, Islamic finance is finance in accordance with Sharia principles. Sharia is a law system inspired by Islam and followed by Muslims throughout the world. One of the essential beliefs of Islamic finance is the prohibition of payment or receipt of interest, or "riba". Under Sharia principles, lending and/or dealing in money in the same way as one would trade commodities is prohibited. Returns on loaned money must be based on actual profits generated and not on pre-determined interest rates. A financial institution that lends money must take part in the risk to make a legitimate gain in accordance with Sharia law.

A sukuk is a known financial instrument used for compliance with Sharia law. A sukuk is typically defined as a financial instrument that represents an undivided proportionate ownership interest in an asset with the corresponding right to the Islamically acceptable income streams generated by the asset. The current income streams from the asset are established and translated into tradable securities, which can be issued in the capital markets for investors' participation. However, these known sukuks do not include a conversion right that enables the sukuk holder to convert the Sharia-compliant sukuk, which is a non-equity interest in an asset or business, into an equity interest in the same asset or business.

It is also known that a sukuk may include an Ijara sukuk, an Istisnaa sukuk, and a Musharaka sukuk. Ijara is an Islamic form of leasing. For example, a bank may buy capital equipment or property and lease it out under installment plans to end-users. As in conventional leasing there may be an option to buy the goods at the end of the Ijara contract. The installment payments consist of rental for use and part-payment. Istisnaa is another type of Islamic financing. Musharaka is a type of Islamic financing that includes equity participation. For example, partners or shareholders may use their capital through a joint venture to generate a profit. Profits or losses are split between the shareholders according to some pre-agreed formula.

The present invention, however, includes a method and system for providing a convertible financial instrument in compliance with Sharia principles, wherein the convertible financial instrument includes a sukuk having a conversion feature. The sukuk portion represents a non-equity ownership interest in the business and includes a coupon return paid from rent or lease payments, and/or profits or capital gains of the business. The sukuk is redeemable at a maturity date at a face value of the sukuk. The sukuk holders do not receive any payments qualifying as interest payments for investing in the sukuk. The conversion feature is exercisable upon reaching a conversion date. The conversion feature enables the sukuk holder to convert the sukuk into an equity-based financial instrument (e.g., stock).

In one embodiment, the system is a computer program embodied on a computer readable medium implemented utilizing Java® and Structured Query Language (SQL) with a client user interface front-end for administration and a web interface for standard user input and reports. (Java is a registered trademark of Sun Microsystems, Inc., Palo Alto, Calif.).

In an example embodiment, the system is web enabled and is run on a business-entity's intranet. In yet another embodiment, the system is fully accessed by individuals having an authorized access outside the firewall of the business-entity through the Internet. In a further example embodiment, the system is being run in a Windows® NT environment (Windows is a registered trademark of Microsoft Corporation, Redmond, Wash.). The application is flexible and designed to run in various different environments without compromising any major functionality.

The systems and processes are not limited to the specific embodiments described herein. In addition, components of each system and each process can be practiced independent and separate from other components and processes described herein. Each component and process also can be used in combination with other assembly packages and processes.

Figure 1:
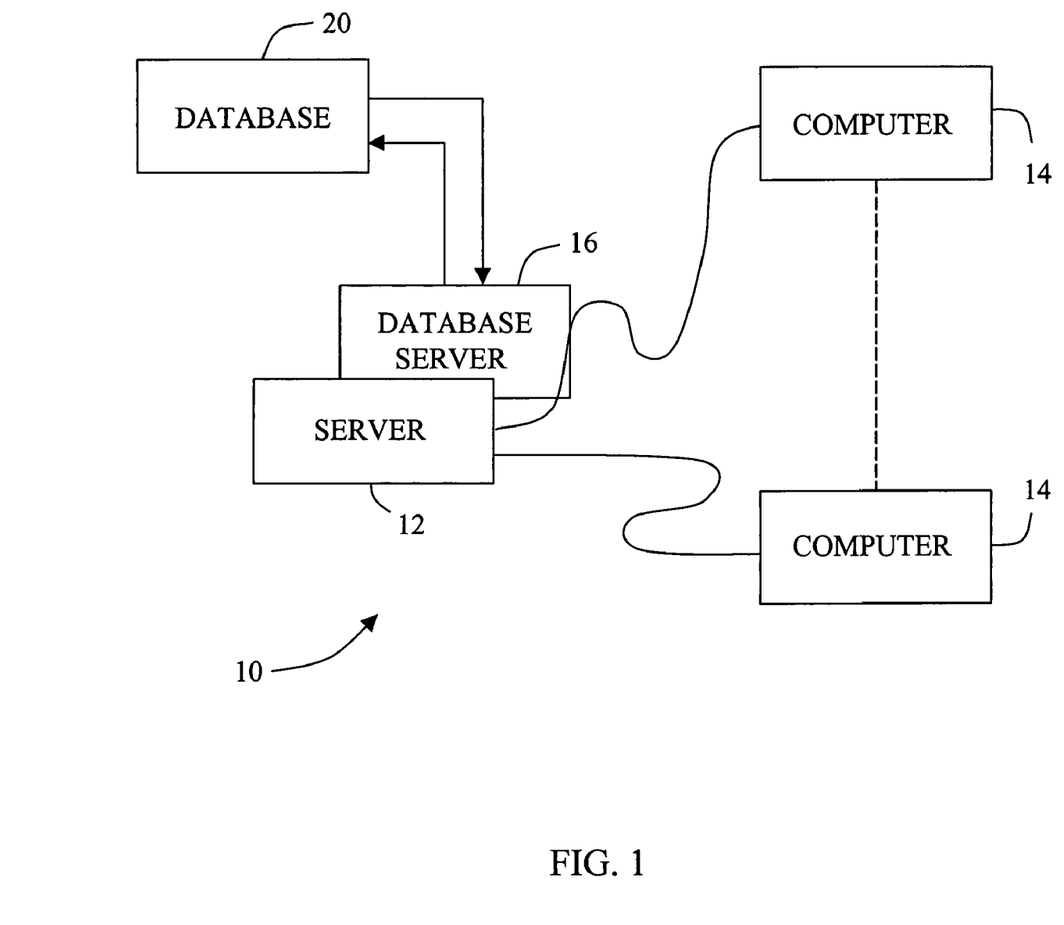
FIG. 1 is a simplified block diagram of a financial instrument issuing system (FIIS) in accordance with one embodiment of the present invention.

FIG. 1 is a simplified block diagram of a financial instrument issuing system (FIIS) 10 including a server system 12, and a plurality of client sub-systems, also referred to as client systems 14, connected to server system 12. In one embodiment, client systems 14 are computers including a web browser, such that server system 12 is accessible to client systems 14 using the Internet. Client systems 14 are interconnected to the Internet through many interfaces including a network, such as a local area network (LAN) or a wide area network (WAN), dial-in-connections, cable modems and special high-speed ISDN lines. Client systems 14 could be any device capable of interconnecting to the Internet including a web-based phone, personal digital assistant (PDA), or other web-based connectable equipment. A database server 16 is connected to a database 20 containing information on a variety of matters, as described below in greater detail. In one embodiment, centralized database 20 is stored on server system 12 and can be accessed by potential users at one of client systems 14 by logging onto server system 12 through one of client systems 14. In an alternative embodiment, database 20 is stored remotely from server system 12 and may be non-centralized.

Figure 2:
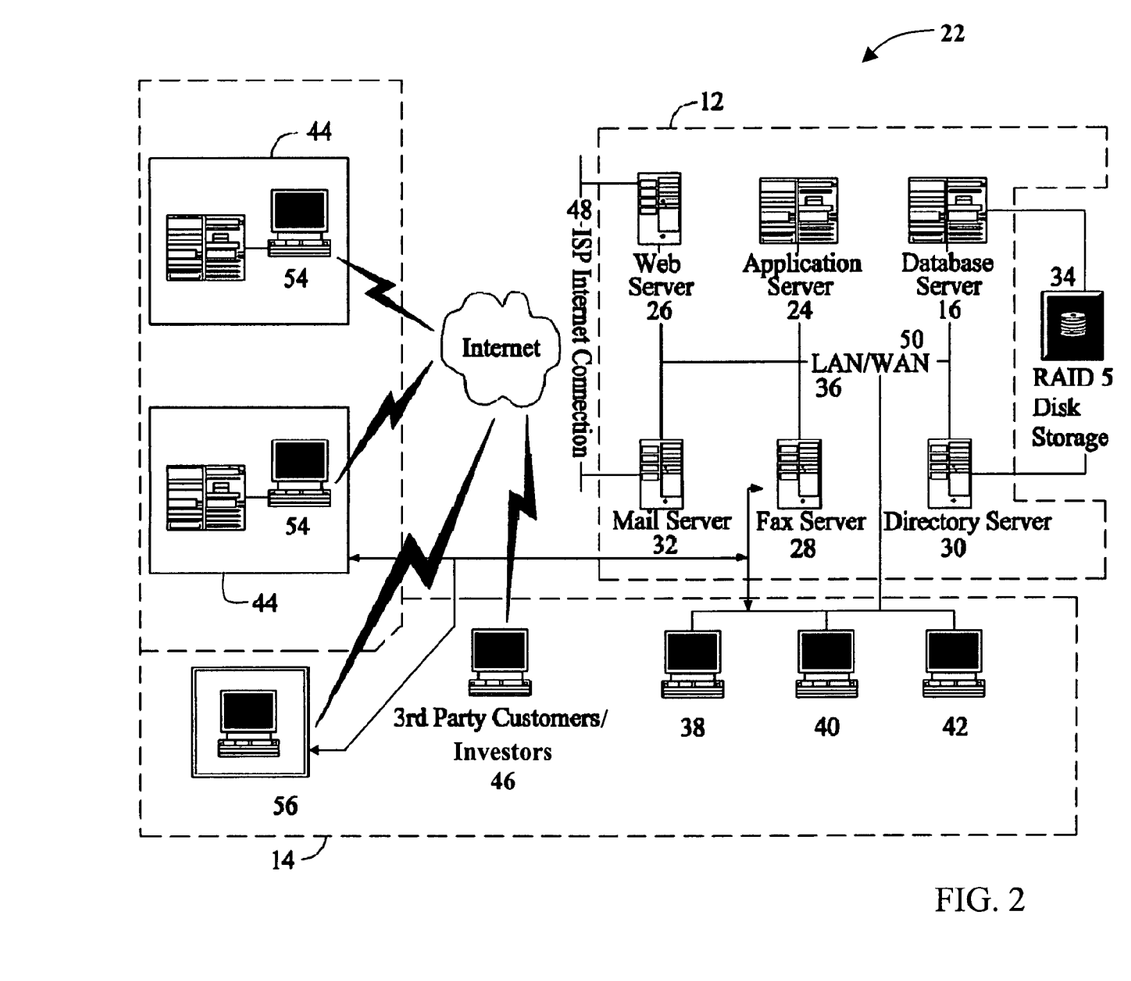
FIG. 2 is an expanded version block diagram of an example embodiment of a server architecture of the FIIS.

FIG. 2 is an expanded block diagram of an exemplary embodiment of a server architecture of a FIIS 22. Components in system 22, identical to components of system 10 (shown in FIG. 1), are identified in FIG. 2 using the same reference numerals as used in FIG. 1. System 22 includes server system 12 and client systems 14. Server system 12 further includes database server 16, an application server 24, a web server 26, a fax server 28, a directory server 30, and a mail server 32. A disk storage unit 34 is coupled to database server 16 and directory server 30. Servers 16, 24, 26, 28, 30, and 32 are coupled in a local area network (LAN) 36. In addition, a system administrator's workstation 38, a user workstation 40, and a supervisor's workstation 42 are coupled to LAN 36. Alternatively, workstations 38, 40, and 42 are coupled to LAN 36 using an Internet link or are connected through an Intranet.

Each workstation, 38, 40, and 42 is a personal computer having a web browser. Although the functions performed at the workstations typically are illustrated as being performed at respective workstations 38, 40, and 42, such functions can be performed at one of many personal computers coupled to LAN 36. Workstations 38, 40, and 42 are illustrated as being associated with separate functions only to facilitate an understanding of the different types of functions that can be performed by individuals having access to LAN 36.

Server system 12 is configured to be communicatively coupled to various individuals, including employees 44 and to third parties, e.g., clients/customers/investors, 46 using an ISP Internet connection 48. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 50, local area network 36 could be used in place of WAN 50.

In the exemplary embodiment, any authorized individual having a workstation 54 can access FIIS 22. At least one of the client systems includes a manager workstation 56 located at a remote location. Workstations 54 and 56 are personal computers having a web browser. Also, workstations 54 and 56 are configured to communicate with server system 12. Furthermore, fax server 28 communicates with remotely located client systems, including a client system 56 using a telephone link. Fax server 28 is configured to communicate with other client systems 38, 40, and 42 as well.

System 22 accumulates a variety of confidential data and has different access levels to control and monitor the security of and access to system 22. Authorization for access is assigned by system administrators on a need to know basis. In one embodiment, access is provided based on job functions. In yet another embodiment, system 22 provides access based on business-entity. The administration/editing capabilities within system 22 are also restricted to ensure that only authorized individuals have access to modify or edit the data existing in the system. System 22 manages and controls access to system data and information.

The architectures of system 22 as well as various components of system 22 are exemplary only. Other architectures are possible and can be utilized in connection with practicing the processes described below.

Figure 3:
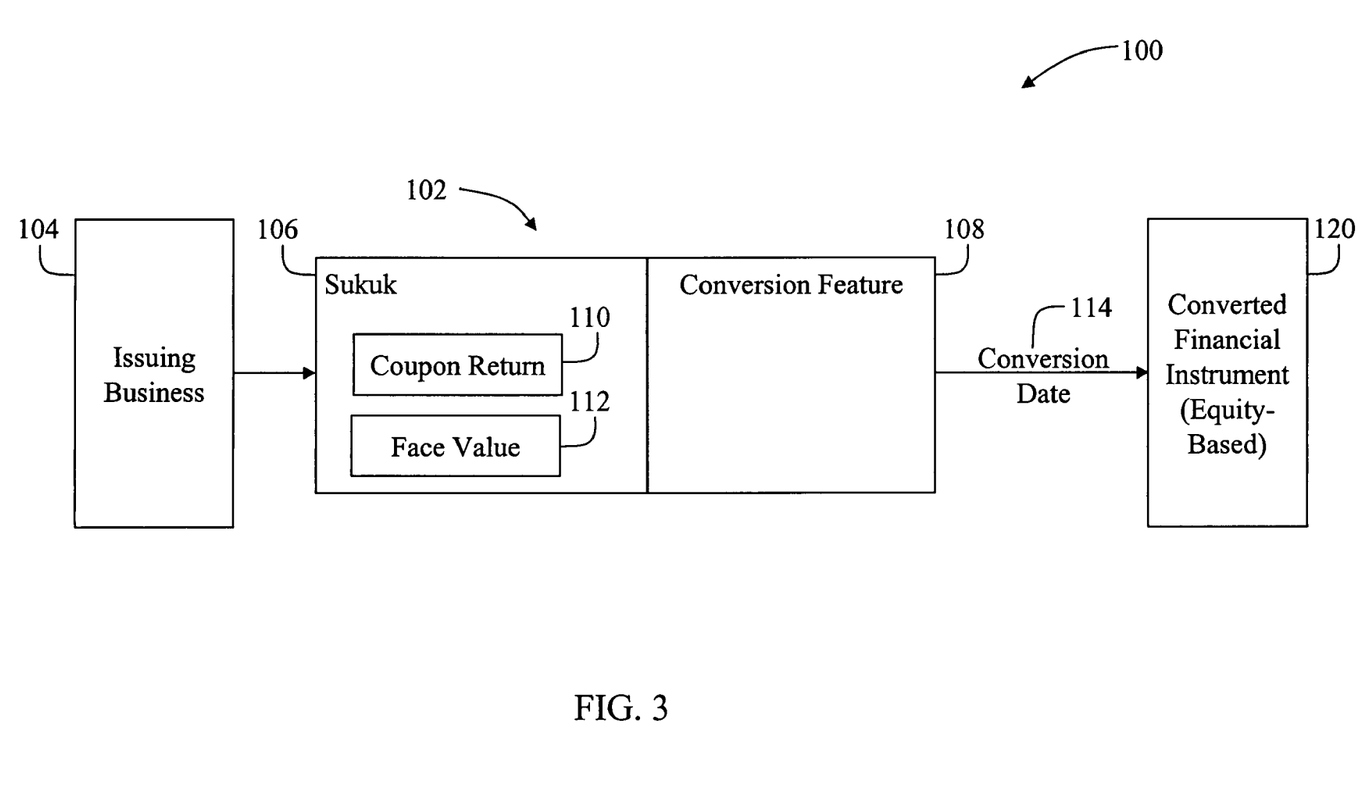
FIG. 3 is a block diagram illustrating an example embodiment of a convertible financial instrument issued using the FIIS.

FIG. 3 is a block diagram 100 illustrating an example embodiment of a convertible financial instrument 102 which is issued by a business 104 in compliance with Sharia principles. Financial instrument 102 includes a sukuk 106 and a conversion feature 108 included with sukuk 106. In the example embodiment, sukuk 106 represents a non-equity ownership interest in business 104 or an asset associated with business 104. Sukuk 106 may also represent a beneficial ownership interest in an underlying asset of business 104. Sukuk 106 includes a coupon return 110 that is paid from rent or lease payments, and/or profits or capital gains of business 104. Sukuk 106 is redeemable at a maturity date at a face value 112 of sukuk 106.

In the example embodiment, sukuk 106 includes conversion feature 108. Conversion feature 108 is exercisable by the investor upon reaching a conversion date 114. When exercised by the investor, conversion feature 108 enables a holder of sukuk 106 to convert sukuk 106 into a converted financial instrument 120. Converted financial instrument 120 represents an equity ownership interest in business 104. The conversion is based on a predetermined formula. In other words, conversion feature 108 enables a holder of financial instrument 102 to convert a non-equity ownership interest in business 104 into an equity ownership interest in business 104 upon reaching a conversion date.

Business 104 typically issues a plurality of financial instruments 102 for the purposes of raising capital for the business. After issuing the plurality of financial instruments 102, business 104 must distribute net profits in accordance with the terms and conditions of the issuance. In the example embodiment, business 104 would distribute net profits of the business in the following order: (i) first, payment of expenses of the business; (ii) second, 100% to holders of sukuk 106, until a cumulative amount of proceeds distributed to the sukuk holders equals in any given year a predetermined percentage return based on the face amount of the respective sukuk (e.g., a 5% per annum non-cumulative return payable quarterly on the face amount of the respective sukuk); and (iii) third, once annual net profits distributed to holders of converted financial instruments 120 equal a predetermined percentage in any given year, a portion of the remaining annual net profits are distributed among management of the business and the holders of the converted financial instruments.

In the example embodiment, coupon return 110 of sukuk 106 is not an interest payment. In other words, coupon return 110 is paid from rent or lease payments, and/or profits or capital gains of the business such that financial instrument 102 complies with Sharia principles. Coupon return 110 is based on the face value 112 of sukuk 106 and is only paid if business 104 experiences profits and/or capital gains. Moreover, sukuk 106 may be based on at least one of Ijara, Istisnaa and Musharaka financing principles.

In the example embodiment, conversion feature 108 is a legal right that is linked to sukuk 106. Conversion feature 108 is exercisable by the sukuk holder and allows the holder to convert financial instrument 102, which includes a non-equity interest in business 104, into converted financial instrument 120. Converted financial instrument 120 represents an equity interest in business 104. The conversion is based on a predetermined formula. For example, the formula may convert financial instrument 102 into converted financial instrument 120 based on the face value amount 112 of sukuk 106 and a current net asset value (NAV) of converted financial instrument 120. In the example embodiment, the predetermined conversion formula may include a conversion premium for converting the sukuk to the converted financial instrument or may not include a conversion premium.

In the example embodiment, sukuk 106 is also redeemable at a maturity date at the face value 112 of sukuk 106 plus any unpaid and owing coupon return 110. Sukuk 106 is only redeemable if, however, business 104 has sufficient cash to redeem the sukuks presented for redemption on the maturity date. In one embodiment, business 104 has the right to redeem all or some of the sukuks presented for redemption on a pro-rata basis.

For example, a business may decide to offer a plurality of financial instruments in an investment fund (the "Fund") that comply with Sharia principles as described herein. These Sharia-compliant financial instruments would be offered to investors. The financial instruments may include, by way of example, a 5 percent, periodic distribution per annum convertible sukuk (the "Sukuk Unit"). The 5 percent periodic distribution is known as the "Coupon Return". The business may also issue a separate financial instrument in the Fund such as an equity-based instrument referred to herein as ordinary Units ("Ordinary Units"). The offering may include Lock up and Redemption provisions such that no redemptions are allowed for the first three years of the Fund's term ("Lockup Period"). Thereafter, the investors may redeem their Ordinary Units and Sukuk Units at quarterly intervals subject to availability of sufficient cash at the Fund at their respective Net Asset Value in the case of Ordinary Units and at face value in the case of Sukuk upon ninety (90) days prior written notice. The Redemption provisions may further provide that redemptions will be subject to a redemption charge of 3% of the Net Asset Value of the Ordinary Units or face value of Sukuk Units in the first year of the redemption period, which shall be reduced to 2% in the next year, and 1% for the balance of the Fund Term. Said redemption charges will be paid 50% to the Fund and 50% to the Fund Manager. The Fund Manager at its option may redeem all or some of the Sukuk Units on a pro rata basis at face value plus any then unpaid and owing coupon amounts on such Sukuk Units. The Fund Manager reserves the right to suspend any redemptions for any year or years after the Lockup Period that exceeds ten percent (10%) of either Ordinary Units or Sukuk Units or exceeds in aggregate ten percent (10%) of the Fund's then current Net Asset Value.

In this example, the Fund may have two classes of participation open to the investors: (1) Ordinary Units priced at $X per Ordinary Unit and (2) convertible Sukuk Units ("Sukuk Units") at $Y per Sukuk Unit for a total offering of $Z. Investors may be required to purchase two (2) Sukuk Units for every one Ordinary Unit they purchase during the Lock Up period. Thereafter, investors may purchase Ordinary Units or Sukuk Units together or separately. In addition, the Sukuk Units may be issued at par each and will be subject to a periodic non-cumulative per annum distribution of five percent (5%) subject to availability of and to be paid from the income and/or capital gains generated by the Fund's investments. On a specified day, certificate holders can expect to receive from proceeds received from and in respect of the Fund assets a periodic distribution equal to 5% per cent per annum calculated on the face value of the Sukuk. Sukuk Units may be on an Ijara, Istisnaa or Musharaka basis or combination thereof, and will represent a beneficial ownership in the underlying asset or business and returns to Sukuk Unitholders would come from rent or lease payments, and/or profits or capital gains.

In this example, the offering may include distribution provisions. The distribution provisions may provide that distributions of net profit of the Fund will be made by the Fund as follows: (i) first, payment of organizational expenses management, custody, and other fund expenses; (ii) second, 100% to the Sukuk Unitholders, until the cumulative amount of proceeds distributed to them equals in any given year a 5% per annum non-cumulative return payable quarterly ("Coupon Return") on the face amount of their respective Sukuk Unit; and (iii) third, once annual net profits distributed to the Ordinary Unitholders of the Fund equal 10% in any given year ("Hurdle") fifty percent (50%) of all annual net profits in excess of the Hurdle will be distributed, 50% to the Fund Manager and 50% to the Ordinary Unitholders. Distributions to the Fund Manager under paragraph (iii) above are sometimes referred to as "Carried Interest".

In this example, the offering may include a Sukuk Conversion provision. Under the Sukuk Conversion provision investors would be able to convert their Sukuk Units upon thirty (30) days written notice to the Fund Manager after the two (2) year Lock-up period in accordance with the following formula: Sukuk Units may be converted to Ordinary Units based on the face amount of the Sukuk Unit and the then current NAV of the Ordinary Units or at a predetermined conversion premium.

The example discussed above is not intended to be limiting. Rather, the example is provided for illustration purposes. The systems, processes and financial instruments discussed herein are not limited to the specific embodiments described herein. In an alternative embodiment, any similar features or amounts known to those skilled in the art and guided by the teachings herein provided may be used in issuing such a convertible financial instrument.

Figure 4:
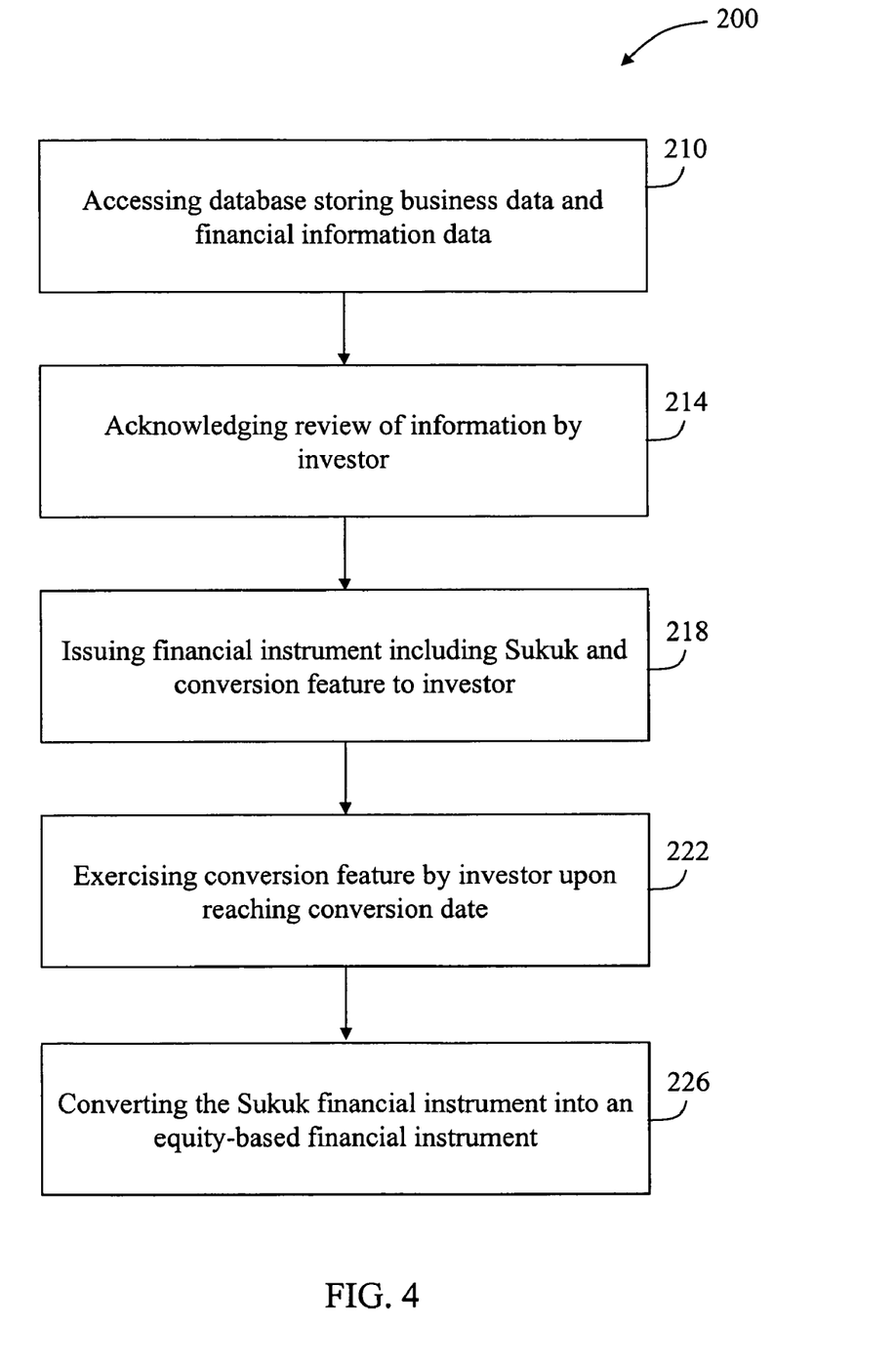
FIG. 4 is a flowchart illustrating exemplary processes utilized by FIIS for issuing a convertible financial instrument as shown in FIG. 3.

FIG. 4 is a flowchart 200 illustrating exemplary processes utilized by FIIS 10 (shown in FIG. 1). The technical effect of the processes and systems described herein is achieved by an investor first accessing 210 a database of information wherein the database stores data relating to a business issuing financial instrument 102 (shown in FIG. 3) and data relating to convertible financial instrument 102 including rights and obligations associated therewith. The investor, also known as a user or the customer, acknowledges 214 that the user has reviewed the displayed information. The business then issues 218 a financial instrument that includes a sukuk having a conversion feature and a coupon return. The sukuk represents a non-equity ownership interest in the business. The coupon return is paid from rent or lease payments, and/or profits or capital gains of the business. The sukuk is redeemable at a maturity date at a face value of the sukuk. After issuing 218 the sukuk, the investor has the right to exercise 222 the conversion feature upon reaching a conversion date. The conversion feature is exercisable for converting the sukuk based on a predetermined formula into a converted financial instrument representing an equity ownership interest in the business.

In the example embodiment, the coupon return is not an interest payment. The coupon return is based on the face value of the sukuk and is only paid if the business experiences profits and/or capital gains. The coupon return is a periodic non-cumulative per annum distribution of five percent (5%) of the face value of the sukuk subject to availability of and to be paid from at least one of profits and capital gains generated by the business. The sukuk is issued in compliance with Sharia principles. In another embodiment, a plurality of different coupon return rates are used.

In the example embodiment, the sukuk includes a conversion feature which is linked to the sukuk and is a legal right. The conversion feature is exercisable by the sukuk holder and enables the sukuk holder to convert the sukuk into an equity-based financial instrument based on a predetermined formula. The predetermined formula may include converting a sukuk into a converted financial instrument based on the face amount of the sukuk and a current net asset value (NAV) of the converted financial instrument. The predetermined formula may also include a conversion premium for converting the sukuk into the converted financial instrument. The converted financial instrument is an equity-based instrument including, but not limited to, common stock and preferred stock.

In the example embodiment, the sukuk is also redeemable at a maturity date at the face value of the sukuk plus any unpaid and owing coupon return. The issued sukuks are redeemable after reaching a maturity date subject to the business having sufficient cash to redeem each of the plurality of sukuks presented for redemption on the maturity date. The business has the right to redeem all or some of the plurality of sukuks presented for redemption on a pro-rata basis.

The present invention therefore describes a method and system for providing or issuing a convertible financial instrument in compliance with Sharia principles. The convertible financial instrument includes a sukuk and a conversion feature. The sukuk represents a non-equity ownership interest in the business. The sukuk includes a coupon return paid from rent or lease payments, and/or profits or capital gains of the business. The sukuk is redeemable at a maturity date at a face value of the sukuk. The sukuk holders do not receive any payments qualifying as interest payments for investing in the sukuk. The conversion feature is exercisable upon reaching a conversion date. The conversion feature gives the sukuk holder the right to convert the sukuk into a converted financial instrument representing an equity ownership interest in the business (e.g., stock). Accordingly, the financial instrument described herein provides an investor with a Sharia-compliant financial instrument. The financial instrument is initially a non-equity sukuk having a coupon return paid from rent or lease payments, and/or profits or capital gains of the business. The coupon return does not include any payments qualifying as interest on an investment. In addition, the financial instrument includes a conversion feature that allows a holder to convert the sukuk to an equity-based financial instrument. For these reasons, the financial instrument is Sharia-compliant.

While the invention has been described in terms of various specific embodiments, those skilled in the art will recognize that the invention can be practiced with modification within the spirit and scope of the claims.

What is claimed is:

1. A method for providing a convertible financial instrument for raising capital by an issuing business, the convertible financial instrument structured to generate returns that are based on actual profits and capital gains of the issuing business and not on a pre-determined interest rate, the method uses a computer coupled to a database, the method comprising:

issuing the convertible financial instrument having a conversion feature and a coupon return, the convertible financial instrument representing a non-equity ownership interest in the issuing business, the coupon return paid from at least one of profits and capital gains of the issuing business, the convertible financial instrument redeemable at a maturity date at a face value of the convertible financial instrument;

storing data relating to the issuing business and the convertible financial instrument in the database;

exercising the conversion feature upon reaching a conversion date, the conversion feature exercisable for converting the convertible financial instrument into a converted financial instrument representing an equity ownership interest in the issuing business;

calculating, by the computer, a value for the converted financial instrument based on a predetermined formula and the data stored in the database; and converting the convertible financial instrument into the converted financial instrument based on the calculated value.

2. A method in accordance with claim 1 further comprising distributing net profits of the issuing business in the following order:

(i) first, payment of expenses of the issuing business;

(ii) second, 100% to holders of the convertible financial instrument, until a cumulative amount of proceeds distributed to holders of the convertible financial instrument equals in any given year a first predetermined percentage return based on the face amount of the respective convertible financial instrument; and (iii) third, once annual net profits distributed to holders of the converted financial instruments equal a second predetermined percentage in any given year, a portion of the remaining annual net profits are distributed among management of the issuing business and the holders of the converted financial instruments.

3. A method in accordance with claim 1 wherein issuing the convertible financial instrument further comprises issuing the convertible financial instrument having a conversion feature and a coupon return, the coupon return is not an interest payment.

4. A method in accordance with claim 1 wherein issuing the convertible financial instrument further comprises issuing the convertible financial instrument having a conversion feature and a coupon return, the coupon return being based on the face value of the convertible financial instrument and is only paid if the issuing business experiences at least one of profits and capital gains.

5. A method in accordance with claim 1 wherein issuing the convertible financial instrument further comprises issuing the convertible financial instrument having a conversion feature and a coupon return, the coupon return including a periodic non-cumulative per annum distribution of five percent (5%) of the face value of the convertible financial instrument subject to availability of and to be paid from at least one of profits and capital gains generated by the issuing business.

6. A method in accordance with claim 1 wherein issuing the convertible financial instrument further comprises issuing the convertible financial instrument relating to at least one of a form of leasing, a form of financing, and a form of financing through equity participation.

7. A method in accordance with claim 1 wherein exercising the conversion feature further comprises exercising the conversion feature upon reaching a conversion date wherein the conversion feature is a legal right included with the convertible financial instrument.

8. A method in accordance with claim 1 wherein calculating a value for the converted financial instrument further comprises calculating a value for the converted financial instrument based on the face value of the convertible financial instrument, a current net asset value (NAV) of the converted financial instrument, and a predetermined conversion premium.

9. A method in accordance with claim 8 wherein exercising the conversion feature further comprises exercising the conversion feature wherein the converted financial instrument is a share of common stock in the issuing business.

10. A method in accordance with claim 1 wherein issuing the convertible financial instrument further comprises issuing the convertible financial instrument that is redeemable at a maturity date at the face value of the convertible financial instrument plus any unpaid and owing coupon return.

11. A method in accordance with claim 1 wherein issuing the convertible financial instrument further comprises issuing a plurality of convertible financial instruments that are redeemable after reaching a maturity date subject to the issuing business having sufficient cash to redeem each of the plurality of convertible financial instruments presented for redemption on the maturity date.

12. A method in accordance with claim 11 wherein issuing the convertible financial instrument further comprises providing the issuing business with a right to redeem all or some of the plurality of convertible financial instruments presented for redemption on a pro-rata basis.

13. A network-based system for issuing a convertible financial instrument to a customer for raising capital for an issuing business, the convertible financial instrument structured to generate returns that are based on actual profits and capital gains of the issuing business and not on a pre-determined interest rate, the system comprising:
 a database for storing data relating to the issuing business and relating to the convertible financial instrument including rights and obligations associated with the convertible financial instrument;
 a client system comprising a browser; and
 a server system coupled to the database and the client system, the server configured to:
  display information stored in the database on the client system including financial instrument data and business data;
  receive an acknowledgment from the client system that the customer has reviewed the displayed information;
  issue to the customer the convertible financial instrument having a conversion feature and a coupon return using the client system, the convertible financial instrument representing a non-equity ownership interest in the issuing business, the coupon return paid from at least one of profits and capital gains of the issuing business, the convertible financial instrument redeemable at a maturity date at a face value of the convertible financial instrument;
  prompt the customer using the client system to exercise the conversion feature after reaching a conversion date, the conversion feature exercisable to convert the convertible financial instrument into a converted financial instrument representing an equity ownership interest in the issuing business;
  calculate a value for the converted financial instrument based on a predetermined formula and the data stored in the database; and
  convert the convertible financial instrument into the converted financial instrument based on the calculated value.

14. A system in accordance with claim 13 wherein the server is further configured to determine a distribution of net profits of the issuing business based on the following order:
 (i) first, payment of expenses of the issuing business;
 (ii) second, 100% to holders of the convertible financial instrument, until a cumulative amount of proceeds distributed to holders of the convertible financial instrument equals in any given year a first predetermined percentage return based on the face amount of the respective convertible financial instrument; and
 (iii) third, once annual net profits distributed to holders of the converted financial instruments equal a second predetermined percentage in any given year, a portion of the remaining annual net profits are distributed among management of the issuing business and the holders of the converted financial instruments.

15. A system in accordance with claim 13 wherein the coupon return of the convertible financial instrument is not an interest payment.

16. A system in accordance with claim 13 wherein the coupon return of the convertible financial instrument is based on the face value of the convertible financial instrument and is only paid if the issuing business experiences at least one of profits and capital gains.

17. A system in accordance with claim 13 wherein the coupon return of the convertible financial instrument comprises a periodic non-cumulative per annum distribution of five percent (5%) of the face value of the convertible financial instrument subject to availability of and to be paid from at least one of profits and capital gains generated by the issuing business.

18. A system in accordance with claim 13 wherein the server is further configured to calculate the value for the converted financial instrument based on the face value of the convertible financial instrument, a current net asset value (NAV) of the converted financial instrument, and a predetermined conversion premium.

19. A system in accordance with claim 18 wherein the converted financial instrument is a share of common stock in the issuing business.

20. A system in accordance with claim 13 wherein the server is further configured to prompt a holder of the convertible financial instrument to redeem the convertible financial instrument at a maturity date and at the face value of the convertible financial instrument plus any unpaid and owing coupon return.

21. A system in accordance with claim 13 wherein the server is further configured to issue a plurality of convertible financial instruments that are redeemable after reaching a maturity date subject to the issuing business having sufficient cash to redeem each of the convertible financial instruments presented for redemption on the maturity date.

22. A system in accordance with claim 21 wherein the server is further configured to redeem all or some of the plurality of convertible financial instruments presented for redemption on a pro-rata basis.

23. A system in accordance with claim 13 wherein the client system is coupled to the server system and the database using a network including one of a wide area network, a local area network, an intranet and the Internet.

24. A system in accordance with claim 13 wherein the convertible financial instrument represents a non-equity ownership interest in the issuing business and a beneficial ownership interest in an underlying asset of the issuing business.

25. A computer readable storage medium tangibly embodying program instructions for providing a convertible financial instrument for raising capital by an issuing business, the convertible financial instrument structured to generate returns that are based on actual profits and capital gains of the issuing business and not on a predetermined interest rate, the instructions configured to instruct a computer to:

issue to a customer the convertible financial instrument having a conversion feature and a coupon return, the convertible financial instrument representing a non-equity ownership interest in the issuing business, the coupon return paid from at least one of profits and capital gains of the issuing business, the convertible financial instrument redeemable at a maturity date at a face value of the convertible financial instrument;

store data relating to the issuing business and the convertible financial instrument in the database;

prompt the customer to exercise the conversion feature upon reaching a conversion date, the conversion feature exercisable for converting the convertible financial instrument into a converted financial instrument representing an equity ownership interest in the issuing business;

calculate a value for the converted financial instrument based on a predetermined formula and the data stored in the database; and convert the convertible financial instrument into the converted financial instrument based on the calculated value.

* * * * *